United States Patent Office 3,226,233
Patented Dec. 28, 1965

3,226,233
PHOTOSENSITIVE COMPOSITIONS CONTAINING LEUCOCYANIDES OF TRIPHENYLMETHANE DYES
Meyer S. Agruss, Chicago, Ill., assignor to Miehle-Goss-Dexter, Incorporated, Chicago, Ill., a corporation of Delaware
No Drawing. Filed June 13, 1960, Ser. No. 35,447
10 Claims. (Cl. 96—82)

This invention relates to the art of printing and is particularly concerned with the preparation of new and useful photosensitive compositions which may be coated on paper or other suitable surfaces, in the form of essentially colorless or relatively lightly colored bodies, and which are rendered colored or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, certain nitriles, certain aromatic amines, veratrole, resorcinol dimethyl ether, ethylene glycol ethers, phosphoric acid esters of monohydroxy compounds, aromatic carbinols, and numbers of other compounds. These approaches, and others, are disclosed in various patents among which may be mentioned U.S. Patent Nos. 2,441,561; 2,528,496; 2,676,887; 2,829,052 and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem, generally, for example, by the addition of acids, particularly non-volatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

Other difficulties have also been encountered in connection with attempting to evolve commercially practicable compositions. Such difficulties have centered around such matters as inadequate maintenance of the sharpness of reproductions, adverse effects resulting from reactions of the leucocyanide or the dye with sizes inherently present in the papers which are coated with the leucocyanide compositions, and the fact that the activation of the dye in the presence of ultraviolet or other actinic light requires a much longer period of time through an ordinary film negative than when no transparency is used. In my copending application Serial No. 4,875, filed January 27, 1960, now U.S. Pat. No. 3,131,072, effective solutions to such problems are disclosed.

It has been discovered, in accordance with the present invention, that the utilization of certain types of phosphors, as hereafter described, in conjunction with aminotriarylacetonitriles, notably leucocyanides of triphenylmethane dyes, in the presence of activators, brings about substantial improvements. These improvements manifest themselves particularly in producing enhanced depth of hue or color and sharper colors or reproductions.

The phosphors which are utilized in accordance with the present invention are those of the type which, when subjected to ultraviolet light of wave length below 4000 angstrom units, emit light having a different and greater wave length in the range up to 4000 angstrom units. More particularly, those phosphors which are especially desirable for use pursuant to the present invention are those which, when subjected to ultraviolet light of wave length in the range of 2500 to 2600 angstrom units, say 2537 angstrom units, emit light having a wave length in the range of 3000 to 3400 angstrom units.

The phosphors of the foregoing type may be selected from those which are well known in the art. These include, among others, sulfides, selenides, borates, phosphates, silicates, vanadates, molybdates, and tungstates, as, for instance, sulfide phosphor of zinc, cadmium, calcium, strontium, barium and magnesium, and zinc-cadmium sulfides, as such in certain cases but generally activated with various metals such as copper, lead, chromium, bismuth, manganese, and rare earth metals such as samarium; alkaline earth metal and zinc phosphates activated with cerium or thallium; aluminum, beryllium, magnesium and zinc silicates activated with cerium or gallium; zinc oxides, aluminum oxides, and magnesium oxide activated with vanadium or potassium or chromium; and alkaline earth metal tungstates such as calcium and strontium tungstates activated with various metals. The foregoing types of phosphors, it will be observed, are of inorganic character and, for convenience, will be referred to in the claims as inorganic metallic salt phosphors. Numbers of such phosphors are commercially marketed, and I prefer particularly to utilize those of the tungstate type which, when subjected to ultraviolet light of the order of 2537 angstrom units wave length, emit light having a wave length mainly in the range of 3200 to 3400 angstrom units. An illustrative commercial one of said phosphors is Sun-Tan Phosphor Type 101, which is a calcium phosphate phosphor activated with thallium, and manufactured by Sylvania Electric Products, Inc.

The leucocyanides of the triphenylmethane dyes which are utilized in accordance with the present invention can be selected, for instance, from those which are known to the art and disclosed in numerous patents and publications of which the foregoing patents are typical. These include, in addition to those previously mentioned, and those disclosed in said foregoing patents, leucocyanide of rosaniline; leucocyanide of new fuchsine; 4,4'-bis-dimethylamino-2"-chloro-triphenylacetonitrile and like leucocyanide compounds represented by the formula

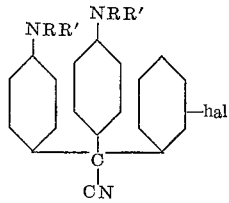

where R and R' are lower alkyl radicals and hal is halogen such as chlorine or bromine.

Various organic solvents can be utilized for the leucocyanides of the triphenylmethane dyes. Low boiling or volatile alcohols, ketones, ethers, esters, and hydrocarbons are available. Typical examples of organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

The activators can be selected from those which are well known in the art, such as those referred to above, as well as various other compounds whose utility as activators has been discovered including various titanium esters as, for example, the titanium esters of (a) $N_1,N_1,N^1,N^1$-tetrakis(2-hydroxypropyl)ethylene diamine; (b) $N_1,N_1,N^1,N^1$-tetrakis(hydroxyethyl)ethylene diamine; and (c) $N_1,N_1,N^1,N^1$-tetrakis(2-hydroxybutyl)ethylene diamine; and cyanuric acid esters such as triallylcyanurate.

The proportions of the ingredients are variable within reasonable limits.

The leucocyanides of the triphenylmethane dyes will generally be utilized in proportions of the order of 0.5% to 3%, preferably from about 1% to 1.5%, by weight of the solution in which they are incorporated and which is utilized for effecting coating of the paper or equivalent surface.

The activators will generally be utilized in proportions of the order of 2 to 25%, preferably about 5 to 12%, by weight of the solution in which the same are incorporated.

The phosphors will generally be utilized in quite small proportions. They may be incorporated into a transparent synthetic plastic coating solution in a volatile organic solvent containing the leucocyanide of the triphenylmethane dye and the activator, in which case, said coating solution should be agitated to maintain the phosphor in a reasonable uniform suspension. The resulting coating solution or suspension is then coated onto paper or the like and dried by evaporating off the organic solvent. Alternatively, and more desirably, the phosphor is suspended in a volatile organic solvent solution of a transparent synthetic plastic, such as cellulose acetate or cellulose acetate-butyrate, the paper or like surface is coated therewith and then dried, and a separate top coating of a volatile organic solvent solution containing a transparent synthetic plastic, such as cellulose acetate or cellulose acetate-butyrate, the leucocyanide of the triphenylmethane dye and the activator, is then applied over the first coating and dried by evaporating off the organic solvent. The resulting coated paper is then ready for exposure to ultraviolet or like light, desirably through a transparency. Generally speaking, the phosphor may be utilized in amounts of the order of 1 to 5 mg. per square inch of paper or other surface to be coated.

The following examples are illustrative of compositions falling within the scope of the invention. They are, of course, not to be construed as in any way limitative of the invention since numerous changes may be made, with respect to selection of leucocyanides, activators, coatings, ranges of proportions, and the like, without departing from the novel principles and teachings presented herein. All parts listed are by weight percent.

*Example 1*

| | |
|---|---:|
| Leucocyanide of crystal violet | 1 |
| Resorcinol dimethyl ether | 25 |
| 20% solution of cellulose acetate-butyrate in 50–50 mixture of toluene and ethyl acetate | 25 |
| Dioxane | 49 |
| Phosphor (in amount sufficient to provide 2 mg. per square inch of paper). | |

*Example 2*

| | |
|---|---:|
| Leucocyanide of pararosaniline | 1 |
| Triallylcyanurate | 20 |
| 20% solution of cellulose acetate-butyrate in 50–50 mixture of toluene and ethyl acetate | 25 |
| Dioxane | 54 |
| Phosphor (in amount sufficient to provide 2 mg. per square inch of paper). | |

*Example 3*

| | |
|---|---:|
| Leucocyanide of malachite green | 1 |
| Titanium ester of $N_1,N_1,N^1,N^1$-tetrakis(2-hydroxypropyl)ethylene diamine | 25 |
| 20% solution of cellulose acetate-butyrate in 50–50 mixture of toluene and ethyl acetate | 25 |
| Dioxane | 49 |
| Phosphor (in amount sufficient to provide 2 mg. per square inch of paper). | |

*Example 4*

Coating A:
| | |
|---|---:|
| Leucocyanide of pararosaniline | 1 |
| Triallylcyanurate | 19 |
| 20% solution of cellulose acetate-butyrate in 50–50 mixture of toluene and ethyl acetate | 25 |
| Dioxane | 55 |

Coating B:
20% solution of cellulose acetate-butyrate in 50–50 mixture of toluene and ethyl acetate.
Phosphor (in amount as in Example 1).

Each of the foregoing compositions of Examples 1, 2 and 3 is coated onto paper on which advantageously a thin barrier coating comprising a toluene-ethyl acetate solution of cellulose acetate butyrate is first deposited and then dried. In the case of Example 4, the coating B is applied to paper, preferably after the latter is provided with a barrier coating as indicated above, (or, alternatively, the coating B can be used as a barrier coating) the coating B is then dried, and then coating A is applied and then dried. The coated paper is then exposed to a source of ultraviolet light through a cellulose acetate butyrate, cellulose acetate or other transparency. The resulting colored papers show good reproductions which are stable over long periods of time to conditions of darkness as well as ambient light.

Transparent cellulose acetate butyrates represent especially desirable organic film-forming barrier coatings, or coatings in solution in which the leucocyanides and the phosphors are incorporated, or top coatings. Other transparent organic film-forming materials can be utilized such as polyvinyl alcohols, cellulose acetates, polyvinyl butyrals, and the like.

Instead of utilizing a single coating of a given thickness containing the leucocyanides of triphenylmethane dyes, it is usually more desirable to employ a plurality of coatings, either two or more, each of thinner character so as to provide a total thickness corresponding to what would otherwise be in the form of a single coating.

The leucocyanides of the triphenylmethane dyes, in the presence of the activators and phosphors, are, as stated above, sensitive when subjected to ultraviolet light and various of them are also sensitive to other electromagnetic radiation shorter than 4000 angstrom units. Moreover, within the ultraviolet range or the aforesaid range of electromagnetic radiation, the various leucocyanides vary in the sensitivity with different wave lengths. In general, the range of wave lengths in which sensitivity mainly occurs is approximately 2000 to 4000 angstrom units, with strongest sensitivity usually lying in the range of 2500 to 3400 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inches. When ultraviolet rays are passed through an ordinary film negative, the time required to cause formation of the dye from its leucocyanide is much longer than when no transparency is used. Hence, in order to obtain rapid activation of the leucocyanide, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

The invention is of value in the arts of color and multicolor printing, photography and photoduplication, microfilm enlargement, and actinometry.

What is claimed and desired to be secured by Letters Patent is:

1. A photosensitive composition, sensitive to ultraviolet light, comprising a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length below 4000 angstrom units, emits light having a different and greater wave length mainly in the range up to 4000 angstrom units.

2. A photosensitive composition, sensitive to ultraviolet light, comprising a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length in the range of 2500 to 2600 angstrom units, emits light having a wave length mainly in the range of 3000 to 3400 angstrom units.

3. A photosensitive composition, sensitive to ultraviolet light, comprising an organic solvent solution containing a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave lengths below 4000 angstrom units, emits light having a different and greater wave length mainly in the range up to 4000 angstrom units.

4. A photosensitive composition, sensitive to ultraviolet light, comprising an organic solvent solution containing a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length in the range of 2500 to 2600 angstrom units, emits light having a wave length mainly in the range of 3000 to 3400 angstrom units.

5. Photosensitive sheet material comprising sheet stock carrying a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length below 4000 angstrom units, emits light having a different and greater wave length mainly in the range up to 4000 angstrom units, said phosphor being present in an amount of the order of 1 to 5 mg. per square inch of said sheet material.

6. Photosensitive sheet material comprising sheet stock carrying a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length in the range of 2500 to 2600 angstrom units, emits light having a wave length mainly in the range of 3000 to 3400 angstrom units, said phosphor being present in an amount of the order of 1 to 5 mg. per square inch of said sheet material.

7. Photosensitive sheet material comprising paper sheet stock carrying a transparent organic film-forming coating containing a leucocyanide of a triphenylmethane dye, an activator for said leucocyanide which renders said leucocyanide sensitive to ultraviolet light, and an inorganic metallic salt phosphor, said phosphor being selected from that group of phosphors which, when subjected to ultraviolet light of wave length below 4000 angstrom units, emits light having a different and greater wave length mainly in the range up to 4000 angstrom units, said phosphor being present in an amount of the order of 1 to 5 mg. per square inch of said sheet material.

8. Photosensitive sheet material comprising sheet stock carrying a transparent organic film coating containing a leucocyanide of a triphenylmethane dye, an activator for said leucocyanide which renders said composition sensitive to ultraviolet light, and an inorganic metallic salt phosphor, said phosphor being selected from that group of phosphors which, when subjected to ultraviolet light of wave length in the range of 2500 to 2600 angstrom units, emits light having a wave length mainly in the range of 3000 to 3400 angstrom units, said phosphor being present in an amount of the order of 1 to 5 mg. per square inch of said sheet material.

9. Photosensitive sheet material comprising sheet stock carrying a transparent coating of a leucocyanide of a triphenylmethane dye and an activator for said leucocyanide which renders said leucocyanide sensitive to ultraviolet light, a separate transparent organic film coating underlying said first mentioned coating and containing an inorganic metallic salt phosphor, said phosphor being selected from that group of phosphors which, when subjected to ultraviolet light of wave length below 4000 angstrom units, emits light having a different and greater wave length mainly in the range up to 4000 angstrom units, said phosphor being present in an amount of the order of 1 to 5 mg. per square inch of said sheet material.

10. Photosensitive sheet material comprising sheet stock carrying a transparent coating of a leucocyanide of a triphenylmethane dye and an activator for said leucocyanide which renders said leucocyanide sensitive to ultraviolet light, a separate transparent organic film coating underlying said first mentioned coating and containing an inorganic metallic salt phosphor, said phosphor being selected from that group of phosphors which, when subjected to ultraviolet light of wave length in the range of 2500 to 2600 angstrom units, emits light having a wave length mainly in the range of 3000 to 3400 angstrom units, said phosphor being present in an amount of the order of 1 to 5 mg. per square inch of said sheet material.

References Cited by the Examiner
UNITED STATES PATENTS

| | | | |
|---|---|---|---|
| 2,168,225 | 8/1939 | Lewin | 96—82 X |
| 2,239,718 | 4/1941 | Izard | 96—82 |
| 2,511,462 | 6/1950 | Clark | 96—82 X |
| 2,528,496 | 11/1950 | Chalkley | 96—90 |
| 2,676,887 | 4/1954 | Chalkley | 96—90 |
| 2,747,997 | 5/1956 | Smith et al. | 96—35 X |
| 2,895,892 | 7/1959 | Chalkley | 96—90 |

FOREIGN PATENTS

| | | |
|---|---|---|
| 163,903 | 6/1921 | Great Britain. |
| 557,102 | 11/1943 | Great Britain. |
| 672,803 | 5/1952 | Great Britain. |

OTHER REFERENCES

Venkataraman: Synthetic Dyes, vol. II, Academic Press, Inc., N.Y., 1952, pages 736–739 and 746.

NORMAN G. TORCHIN, *Primary Examiner.*

HAROLD N. BURSTEIN, PHILLIP E. MANGAN, ABRAHAM H. WINKELSTEIN, *Examiners.*